June 28, 1966 P. C. R. FERNBERG 3,258,234
STRAIN-RELIEF DEVICE
Filed May 21, 1964

Inventor:
Paul Carl Roger Fernberg,
by Gordon Needham
Atty.

3,258,234
STRAIN-RELIEF DEVICE
Paul Carl Roger Fernberg, Farnham Common, England, assignor to United-Carr Incorporated, a corporation of Delaware
Filed May 21, 1964, Ser. No. 369,199
Claims priority, application Great Britain, May 28, 1963, 21,371/63
5 Claims. (Cl. 248—56)

The present invention relates to a fastener for use in the manner of a grommet in attaching a flexible cable in an aperture in a panel so as to absorb any strain imposed on the cable from one or other side of the panel.

According to the invention there is provided a fastener for use in the manner of a strain relieving grommet for a flexible cable and comprising a stud and an insert, the stud having a head and a shank which is resiliently deformable in a radial direction and formed with a tip at its free end and an axially extending cavity running out of the tip and the insert being dimensioned to fit within the cavity so as to form a continuous passage extending radially of the stud between the head and the insert and axially through the shank for reception of a flexible cable.

According to a further aspect of the invention there is also provided a fastener for use in the manner of a strain relieving grommet for a flexible cable and comprising a stud comprising a head having a radially grooved undersurface and a shank which is resiliently deformable in a radial direction and substantially U-shaped in transverse section so as to have two lengthwise extending flanges located one on either side of the groove in the undersurface of the head and joined by a lengthwise extending web portion, and a plug dimensioned to be frictionally engageable between the flanges of the shank so as to leave a continuous passage extending radially into the head and axially through the shank for the reception of a flexible cable.

Figure 1:
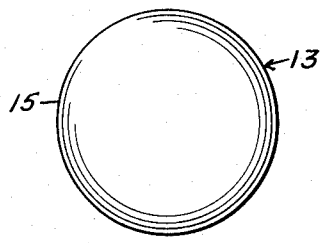
Figure 2:
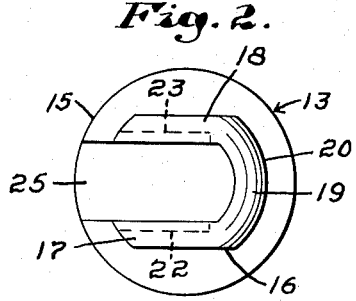
Figure 3:
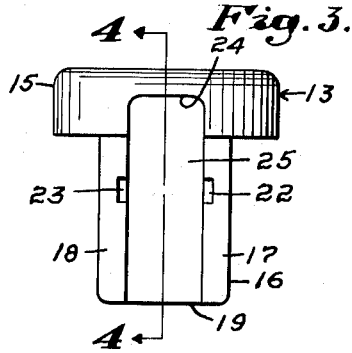
Figure 4:
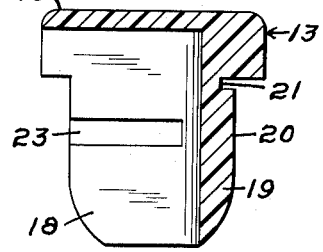

A preferred form of the invention will now be described with reference to the accompanying diagrammatic drawings, in which:

FIGURES 1, 2 and 3 are respectively a plan, underplan and front elevation of a stud, FIGURE 4 is a section on the line IV—IV of FIGURE 3, FIGURES 5, 6 and 7 are respectively a plan, front elevation and side elevation of an insert for the stud of FIGURES 1 to 4, and FIGURE 8 is an elevation, partly in section, showing a cable attached through an aperture in a panel with the aid of the fastener of FIGURES 1 to 7.

Figure 8:
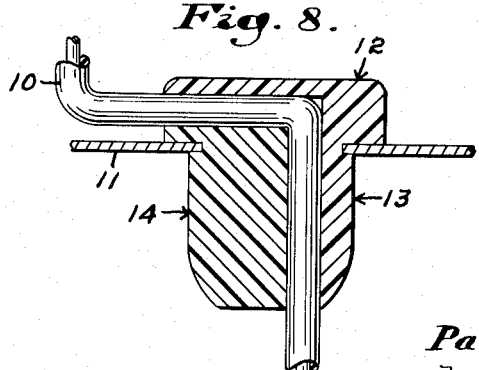

In FIGURE 8 there is shown a cable 10 passing through an aperture, not referenced, in a support panel 11 and attached thereto by a fastener which is indicated generally at 12.

The cable 10 is bent at right angles in the fastener 12 and is secured through the aperture in such a way that any pull exerted on the cable on one side of the support panel 11 is not transmitted, or only to a substantially reduced extent, to the cable on the other side of the panel.

Figure 5:
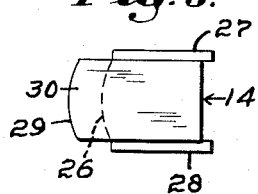
Figure 6:
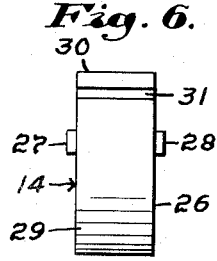
Figure 7:
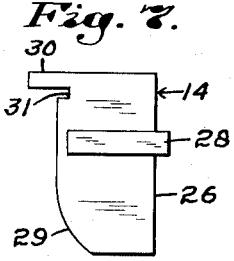

The fastener 12 is manufactured in two parts, a stud which is indicated generally at 13 in FIGURES 1 to 4 and an insert which is indicated generally at 14 in FIGURES 5 to 7. Both the stud 13 and insert 14 are formed from a resilient mouldable material and preferably from a synthetic resin.

The stud 13 has a circular head 15 and a shank 16 which is approximately U-shaped in transverse section and formed by two flanges 17 and 18 joined by a web 19. The web 19 has a radius on its outer surface 20 and a groove 21, which is adapted to engage the rim of a panel aperture, immediately beneath the head 15.

The flanges 17 and 18 of the shank 16 have guide means in the form of stopped slots 22 and 23 respectively formed on their inside surfaces and the head 13 of the stud has a radially extending groove 24 in its undersurface which constitutes an extension of the longitudinally extending cavity 25 which is formed in the shank 16 by the flanges 17 and 18.

The insert 14 comprises a body 26 which is complementary to the cavity 25 in the stud 13 and is shaped to seat between the flanges 17 and 18 of the shank 16.

Guide means in the form of two arms 27 and 28 are formed in the body 26, and the outer surface 29 of the body is curved, similarly to the outer surface 20 of the web of the shank 16.

The upper end 30 of the body 26 is adapted to seat in the groove 24 in the head of the stud 13 when the insert is assembled in the stud, and immediately below the upper end 30, the body is formed with a peripheral groove 31 which is adapted to engage a rim of a panel aperture.

In order to attach the cable 10 to the panel 11, in the manner shown in FIGURE 8, the cable is first passed through the aperture and then a portion of the cable is inserted into the cavity 25 in the shank of the stud. The insert 14 is then brought up to the stud and the arms 27 and 28 are introduced into the slots 22, 23 in the flanges 17, 18 of the shank of the stud. The insert is pressed firmly home into the stud 13 so as to trap the cable securely in the stud and it will be seen that, in the assembled position, the cable is bent at 90° and held in this position by the insert 14, which leaves a continuous substantialy right angled passage through the fastener.

Finally, the shank 16 of the assembled fastener 10 is snapped into the aperture in the panel 11, the size of which may be varied to suit the cable thickness, and the rim of the aperture engages in the grooves 21 and 31 of the stud and insert respectively.

In the final position the cable 10 is held securely to the panel 11 and by virtue of the right angled bend in the cable and the grip obtained on the cable between the insert 14 and the shank of the stud 13 any strain or pull on the cable on one side of the panel is not transmitted to the cable on the other side of the panel or is transmitted only to a substantially reduced extent.

In a modification of the fastener 10 the shank of the stud and the insert may be so shaped that, when assembled together, they form a substantially complete cylinder.

What I claim is:
1. A two-piece fastener for use in the manner of a strain relieving grommet for attaching a flexible cable through an apertured support and comprising a stud and an insert, the stud having a head adapted to bear against a surface of the support and a shank of smaller cross-section than the head for insertion through the aperture in the support, the shank being resiliently deformable in a radial direction and formed with a tip at its free end and an axially extending cavity running out of the tip and the insert being dimensioned to fit within the cavity and being provided with means which co-operate with the shank to form a continuous passage extending radially of the stud between the head and the insert and axially through the shank for the reception of the flexible cable, a flexible cable being adapted to be tightly clamped in the axially extending portion of the passage when the shank and insert are inserted in the aperture in the support.

2. A fastener as claimed in claim 1, in which the undersurface of the head is radially grooved and the insert is dimensioned to fit partly within the radial groove.

3. A two-piece fastener for use in the manner of a strain relieving grommet for attaching a flexible cable through an apertured support and comprising a stud having a head adapted to bear against a surface of the support, the head being formed with a radially grooved undersurface and a shank which is of smaller cross-section than the head for insertion through the aperture in the support the shank being resiliently deformable in a radial direction and substantially U-shaped in transverse section so as to have two lengthwise extending flanges located one on either side of the groove in the undersurface of the head and joined by a lengthwise extending web portion, and a plug dimensioned to be frictionally engageable between the flanges of the shank and being provided with means which co-operate with the shank to leave a continuous passage etxending radially into the head and axially through the shank for the reception of a flexible cable, a flexible cable being adapted to be tightly clamped in the axial portion of the passage when the shank and insert are engaged in the aperture in the support.

4. A fastener as claimed in claim 3, in which the web of the shank is externally arcuate on any transverse section through the shank and the plug has a similarly arcuate surface of equal radius to the external surface of the web of the shank and the shank, with the plug frictionally engaged therein, is adapted for insertion in an apertured support with the web of the shank and the arcuate surface of the plug in tight frictional engagement against diametrically opposite side walls of the aperture in the support to clamp the cable between the insert and the shank.

5. A fastener as claimed in claim 4 in which the insert is provided on opposed side walls with parallel projecting ribs and in which the said lengthwise extending flanges of the shank are provided with parallel slots, the ribs being slidably engageable in the slots to guide the insert into the shank and space the insert from the head so as to form the said radially extending portion of the continuous passage.

References Cited by the Examiner
UNITED STATES PATENTS

| | | | |
|---|---|---|---|
| 2,025,026 | 12/1935 | Deems | 287—20.1 |
| 2,236,352 | 3/1941 | McCarty | 287—20.5 |
| 2,573,600 | 10/1951 | Pruehs | 174—153 |
| 2,724,736 | 11/1955 | Klumpp | 174—153 |
| 3,058,764 | 10/1962 | Scott et al. | 287—20.3 |

CLAUDE A. LE ROY, *Primary Examiner.*

WILLIAM FELDMAN, *Examiner.*

ERNEST SIMONSEN, *Assistant Examiner.*